United States Patent
Kalmbach

(10) Patent No.: US 10,464,857 B2
(45) Date of Patent: Nov. 5, 2019

(54) ORGANIC FERTILIZER/PLANT FOOD CONTAINING MOLASSES

(71) Applicant: Kalmbach Feeds, Inc., Upper Sandusky, OH (US)

(72) Inventor: Paul M. Kalmbach, Upper Sandusky, OH (US)

(73) Assignee: KALMBACH FEEDS, INC., Upper Sandusky, OH (US)

(*) Notice: Subject to any disclaimer, the term of this patent is extended or adjusted under 35 U.S.C. 154(b) by 0 days.

(21) Appl. No.: 15/683,384

(22) Filed: Aug. 22, 2017

(65) Prior Publication Data
US 2019/0062232 A1    Feb. 28, 2019

(51) Int. Cl.
| | | |
|---|---|---|
| C05F 5/00 | (2006.01) | |
| C05F 3/00 | (2006.01) | |
| C05F 1/00 | (2006.01) | |
| C05F 11/00 | (2006.01) | |
| C05B 17/00 | (2006.01) | |
| C05D 1/02 | (2006.01) | |
| C05G 3/00 | (2006.01) | |

(52) U.S. Cl.
CPC .............. *C05F 5/00* (2013.01); *C05B 17/00* (2013.01); *C05D 1/02* (2013.01); *C05F 1/00* (2013.01); *C05F 1/002* (2013.01); *C05F 1/005* (2013.01); *C05F 3/00* (2013.01); *C05F 5/006* (2013.01); *C05F 11/00* (2013.01); *C05G 3/0058* (2013.01)

(58) Field of Classification Search
None
See application file for complete search history.

(56) References Cited

U.S. PATENT DOCUMENTS

| | | | | |
|---|---|---|---|---|
| 3,536,471 | A * | 10/1970 | Ashley | C05D 9/02 71/1 |
| 4,246,018 | A * | 1/1981 | Wahlberg | C05F 5/006 71/23 |
| 4,952,229 | A * | 8/1990 | Muir | A01G 13/0262 47/58.1 R |
| 5,482,529 | A | 1/1996 | Ahlnas et al. | |
| 6,083,293 | A * | 7/2000 | Bath | C05C 9/00 71/16 |
| 6,159,262 | A * | 12/2000 | Tumbers | C05F 3/00 71/7 |
| 6,287,496 | B1 * | 9/2001 | Lownds | C05F 11/02 264/118 |
| 6,572,669 | B1 | 6/2003 | Creech | |
| 7,740,680 | B2 | 6/2010 | Marks | |
| 10,118,869 | B1 * | 11/2018 | Sarah | C05B 17/00 |
| 2003/0020043 | A1 * | 1/2003 | Barresi | A01N 25/08 252/194 |
| 2007/0163316 | A1 * | 7/2007 | Fedkenheuer | C05C 9/00 71/11 |

(Continued)

*Primary Examiner* — Wayne A Langel
(74) *Attorney, Agent, or Firm* — Standley Law Group, LLP; Jeffrey Standley; Adam Smith

(57) ABSTRACT

An organic fertilizer/plant food containing molasses to increase microorganism activity in soils. The molasses provides additional nutrients to the soil that are readily available for plant intake. The molasses provides sugars to increase microorganism activity to benefit soil structure before the slower process of microorganism break-down of other organic materials can occur. The molasses may be applied to the fertilizer mixture in various ways including by spraying.

4 Claims, 3 Drawing Sheets

(56) References Cited

U.S. PATENT DOCUMENTS

| | | | |
|---|---|---|---|
| 2007/0227211 A1* | 10/2007 | McCoy, Jr. | C05D 3/00 71/31 |
| 2013/0097923 A1* | 4/2013 | Cookston | C05G 3/02 47/58.1 R |
| 2014/0230504 A1* | 8/2014 | Finlayson | C05F 11/02 71/6 |
| 2014/0274694 A1* | 9/2014 | Rodriguez-Kabana | C05F 11/00 504/101 |
| 2015/0045215 A1* | 2/2015 | Devine | C05F 17/00 504/101 |
| 2015/0101376 A1* | 4/2015 | Lehtonen | C05C 3/00 71/22 |
| 2015/0239788 A1* | 8/2015 | Yamashita | C05F 11/08 504/101 |
| 2017/0283337 A1* | 10/2017 | Gaunt | C05F 17/0036 |

* cited by examiner

ORGANIC FERTILIZER/PLANT FOOD CONTAINING MOLASSES

CROSS-REFERENCE TO RELATED APPLICATIONS

This application is a non-provisional application and does not claim priority to any application.

TECHNICAL FIELD

Exemplary embodiments of the present invention relate to an organic fertilizer or plant food substance and a method for making that substance, which contains molasses.

BACKGROUND AND SUMMARY OF THE INVENTION

Soil and plant fertilizers or plant foods are essential to healthy plants and gardens. Ensuring plants receive the proper amount of nutrients at the proper time remains an important task of all plant caretakers. Technology in this field is ever-growing and there exists a plethora of synthetic fertilizers in the market today. However, recent trends have brought many consumers back to more natural ways of fertilizing their plants with organic fertilizers or plant foods. Common types of organic fertilizers/plant foods include manure, compost, bone meal, blood meal, worm castings, and fish extracts.

Besides the appeal of organic fertilizers sounding "good for the earth" or "natural," the appeal of organic fertilizers over synthetic ones is not in the types of nutrients the fertilizer provides. The benefits of organic fertilizers/plant food come from both the timing in which the nutrients are available to plants, and the soil structure from natural processes occurring. The plants absorb beneficial nutrients and microbes through their root system. Improved root system health to facilitate nutrient uptake, and optimized nutrient availability are important factors to improved plant health and growth outcomes.

Soil contains many microorganisms that are constantly working to break down organic matter. Whether you use synthetic or organic fertilizer, these microorganisms are already present in the soil. As these microorganisms break down the organic matter in soil, they release nutrients that the plants are now able to absorb through their roots. It is this constant process that provides the plants with a steady stream of nutrients in a form plants can use. Synthetic fertilizers are limited to the nutrients contained within the substance and have no way of producing a constant stream of nutrients for the plants without reapplication.

Furthermore, the natural process of microorganisms breaking down organic material provides for ideal soil structure for root systems. The constant process involves microorganisms eating the organic material, defecating, and dying. This creates a viscous material that clings to the soil granules to form larger clusters. These clusters create an air-space in the soil layer for water to enter or for roots to develop and expand. Synthetic fertilizers do not provide organic matter to the soil for these microorganisms to consume and, thus, do not enhance the soil structure around the root system of plants.

Synthetic fertilizers also have the potential to provide too much or too little nutrients to the plant system. Plants typically require 13 different nutrients. The three primary nutrients that plants need the most of are nitrogen, phosphorous, and potassium (NPK). Most synthetic fertilizers only focus on NPK levels and disregard the other 10 nutrients plants need. The other 10 nutrients plants need are calcium, magnesium, sulfur, boron, copper, iron, chloride, manganese, molybdenum, and zinc. Organic fertilizer is constantly replenishing and providing the nutrients plants need, not just NPK. For example, proteins contain a good source of iron. However, the plant cannot absorb an iron molecule trapped inside a protein. The microorganisms can break down the protein to release the iron in a state usable by the plant. Synthetic fertilizers contain no such process and plants are limited to only those additional nutrients already contained in the soil. Moreover, synthetic fertilizers are subject to leeching from rain water or other underground water-level activity.

Although plants need 13 essential nutrients, obtaining too much of these nutrients can be toxic. The danger with synthetic fertilizers lies in the high concentration of nutrients contained therein. If not properly applied to the soil, the plant may intake too many nutrients and start to deteriorate if not die completely. The natural process provided by organic fertilizer reduces this risk significantly.

One downfall of organic fertilizer is the lack of readily available nutrients at first use. Since organic fertilizers/plant foods rely on microorganisms to break down organic material into smaller nutrient pieces that the plants can intake, this process could take a little while before noticeable results occur. Additionally, time is needed to enhance the soil structure surrounding plant roots. There exists a need for an organic fertilizer/plant food that can quickly provide nutrients to plants and increase soil structure without increasing the risk of toxic overdose to plants. The present invention is designed to overcome this problem.

An exemplary embodiment of the invention will include the ingredient of molasses as an addition to organic fertilizers/plant foods. Molasses is an organic byproduct from the manufacturing process of turning sugarcane or sugar beets into sugar. To make molasses, juice is extracted from sugarcane or sugar beets typically by mashing or crushing. This juice is then brought to a boil which concentrates the liquid, allowing for crystallization to occur. The sugar crystals are removed, and the remaining syrup is molasses. This process can be repeated several times resulting in different types of molasses with varying degrees of refinement.

Since the molasses comes from a plant product itself, sugarcane or sugar beet, molasses contains many essential nutrients that plants need. In addition, molasses mostly consists of sugars which provide a perfect food for microorganisms to feast on. This increased microbial growth is beneficial to the plant root system. The resulting improved root system leads to improved health and growth outcomes for the plant.

These sugars are easier for the microorganisms to process than other organic material found in fertilizers or nature, such as bark, bone meal, manure, or leaves. By adding molasses to a fertilizer/plant food, the microorganisms will quickly begin processing the sugar resulting in incredible microorganism growth and reproduction. Some bacteria can double in population in as little as 20 minutes provided conditions are ideal. Adding molasses to the soil brings the soil environment closer to an ideal state for microorganism growth and reproduction by providing more food that can quickly be processed.

Eventually, the microorganisms will run out of sugars to eat and will have to transition back to processing the other organic material much more slowly. Many of the new microorganisms will die off because food is not as abundant as it was when molasses sugars were in the system. Although adding molasses to the process does not submit to a long-term sustainable environment, the regular organic fertilizer/plant food fills in that void. The molasses merely provides a boost at the initial addition of the fertilizer, solving the problem with current organic fertilizers today. The increased microorganism activity promotes the processing of the organic materials, sugar from molasses, into readily usable nutrients for plant consumption. Furthermore, the increased microorganism activity results in better clustering of the soil, as described above, to promote root development and access to water.

This initial added benefit comes from the addition of sugar to the organic fertilizer/plant food that may not be specific to the sugars in molasses. Other embodiments of the invention will involve adding other organic substances containing sugar to organic fertilizer/plant food, including but not limited to, honey, maple syrup, crystalized sugar, fruit juices, etc.

In addition to the high sugar content of molasses, molasses provides for other benefits as an addition to organic fertilizer. Molasses is known to have excellent chelating properties. Chelation is a type of bonding that attaches two molecules to a central ion. Here, the central ion is often a nutrient that plants need, such as iron or magnesium. This chelation bonding puts the nutrient in a form easily absorbed by the plant.

Molasses also contains many of the nutrients plants need. As a byproduct coming from plants themselves, molasses contains, among other nutrients, calcium, iron, magnesium, manganese, phosphorous, potassium, and zinc. These nutrients replenish the soil and may be absorbed by the plant. These nutrients are largely already in a form that the plant can intake without processing by microorganisms.

While molasses has many benefits to assist in plant growth and soil development, it is important to not add too much molasses. Adding too much molasses to a fertilizer could lead to an influx of nutrients available to the plants risking a toxic amount of absorption. Moreover, microorganisms will respond to their environment and keep multiplying and growing to adapt to the large amount of molasses added. While this may help soil structure, this largely does nothing for the long-term nutrients the plants need. Any excess nutrients remaining in the soil could be leeched away by rain water, providing no help to the plants or soil system. As a result, there is a maximum amount of molasses that can benefit the plants and soil system without becoming, at best wasteful, and, at worst, harmful to the plants. The space the excess molasses would fill would be better occupied by another organic material with a longer break down period for microorganisms, thus, providing sustainable nutrients the molasses could not.

The sugar and nutritional composition of any given molasses can vary depending on multiple factors, for example, how many levels of refinement has the molasses gone through, whether the base came from sugar beets or sugarcane, the strain of sugar beet or sugarcane the molasses came from, etc. However, it is not uncommon for a molasses to have a composition as follows:

| Component | Percent by weight (%) |
|---|---|
| Sugars | 65-85 |
| Vitamins | 0-1 |
| Minerals | 0.5-4 |
| Calcium | 0.001-0.5 |
| Iron | 0.001-0.01 |

| Component | Percent by weight (%) |
|---|---|
| Magnesium | 0.1-0.5 |
| Manganese | 0.001-0.01 |
| Phosphorous | 0.01-0.1 |
| Potassium | 1-3 |
| Sodium | 0.01-0.1 |
| Zinc | 0.0001-0.001 |
| Water | 15-25 |

The above percentages are meant to depict an example of what the composition of molasses may look like but in no way should be interpreted to limit the present invention to only molasses with the above characteristics.

DETAILED DESCRIPTION OF THE INVENTION

Various embodiments of the invention will now be described in detail with reference to the accompanying drawing. These figures are merely provided to assist in the understanding of the invention and are not intended to limit the invention in any way. One skilled in the art will recognize that various modifications and changes can be made to any of these embodiments without departing from the scope and spirit of the present invention.

An exemplary embodiment of the invention may contain a mixture combination of molasses, other organic material, and minerals. This other organic material may include but is not limited to or limited by the following ingredients: soybean meal, wheat midds, meat, bone meal, poultry manure, alfalfa, feather meal, kelp, soybean oil, fish bone meal, fish meal, water, and fungi, such as mycorrhizal fungi. Minerals may include but are not limited to or limited by the following ingredients: tri-calcium phosphate, potassium magnesium sulfate, sulfate of potash, sulfate of potash magnesia, rock phosphate, lime, greensand, and zeolite.

The organic fertilizer/plant food mixture invention may contain a different fungus or microorganism besides mycorrhizal fungi, or the fertilizer may not contain any intentional addition of microorganisms, instead allowing the fertilizer mixture to utilize existing microorganisms in the soil where applied.

Figure 1:
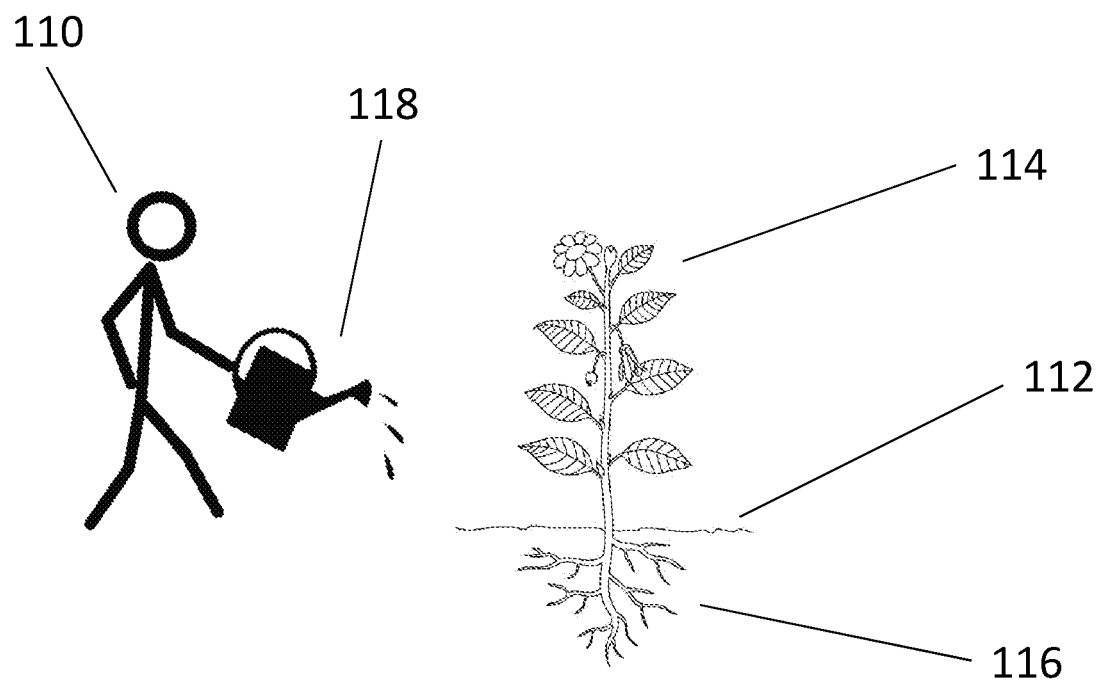
FIG. 1 is a diagram of an example use of the invention.

Referring to FIG. 1, this organic fertilizer/plant food may be applied by a person 110 to the soil 112 where the person currently has plants 114 growing or intends to grow soon. Because the molasses in the organic fertilizer enhances soil 112 quality, this organic fertilizer can be used even before anything is planted in the soil 112. The microorganisms in the soil 112 or organic fertilizer will break down the organic material in the fertilizer, including the molasses. This process will occur much faster while sugars from the molasses persist and slow down once the molasses has been completely consumed by the microorganisms. Throughout the process, the soil 112 will continue to improve in quality from the microorganism-created soil clustering, as described above. This will provide ample room for the roots 116 of any plants 114 to grow. This will also provide space for water 118 to fill up and reside, allowing the plant 112 to soak up as much as is needed.

Figure 2:
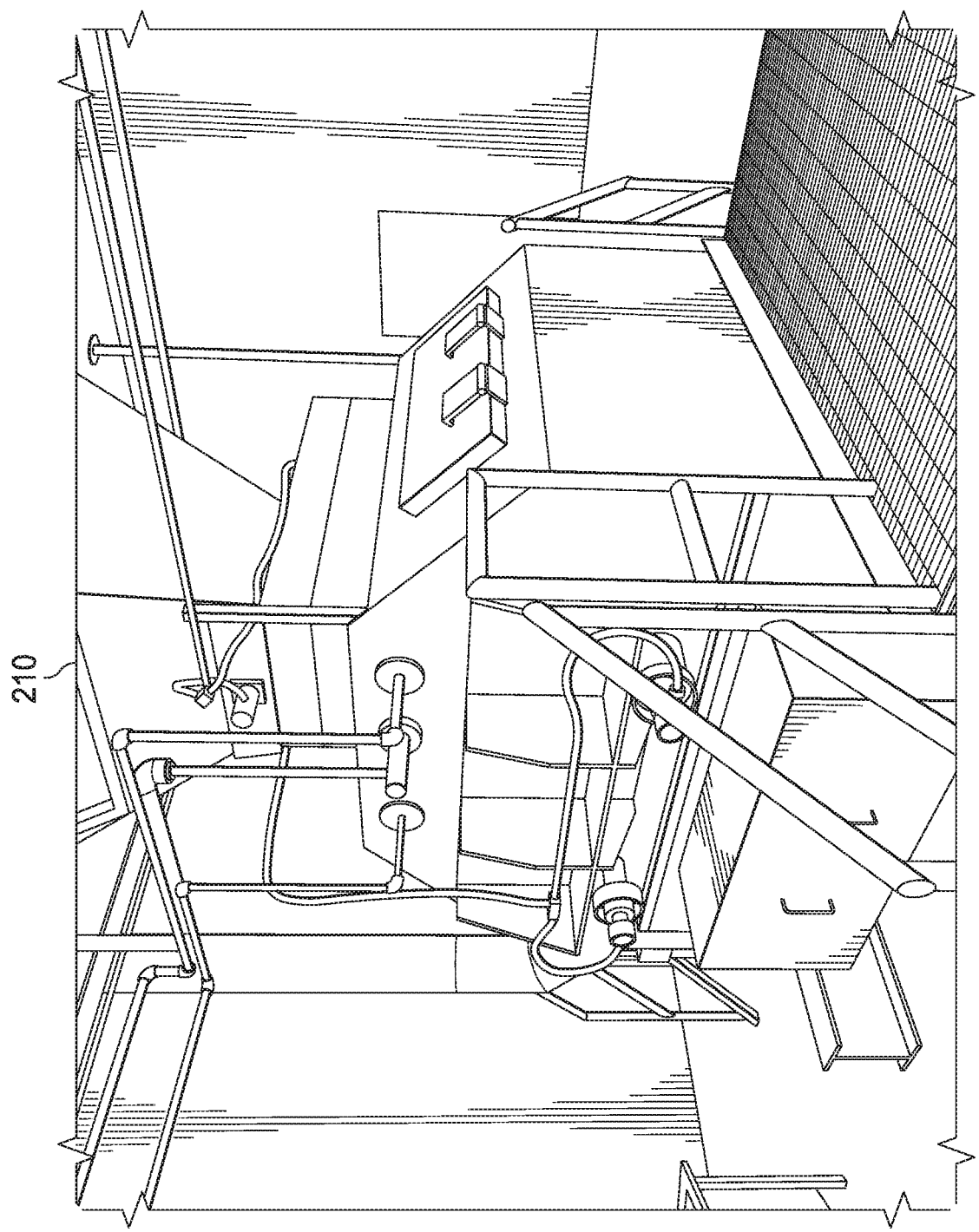
FIG. 2 is a sample industrial mixer to mix the invention.

Referring to FIG. 2, the organic fertilizer/plant food invention may be mixed using an industrial mixer 210. The formulation ingredients are added to the mixer along with the molasses. The ingredients are mixed until consistent throughout the resultant mixture.

Figure 3:
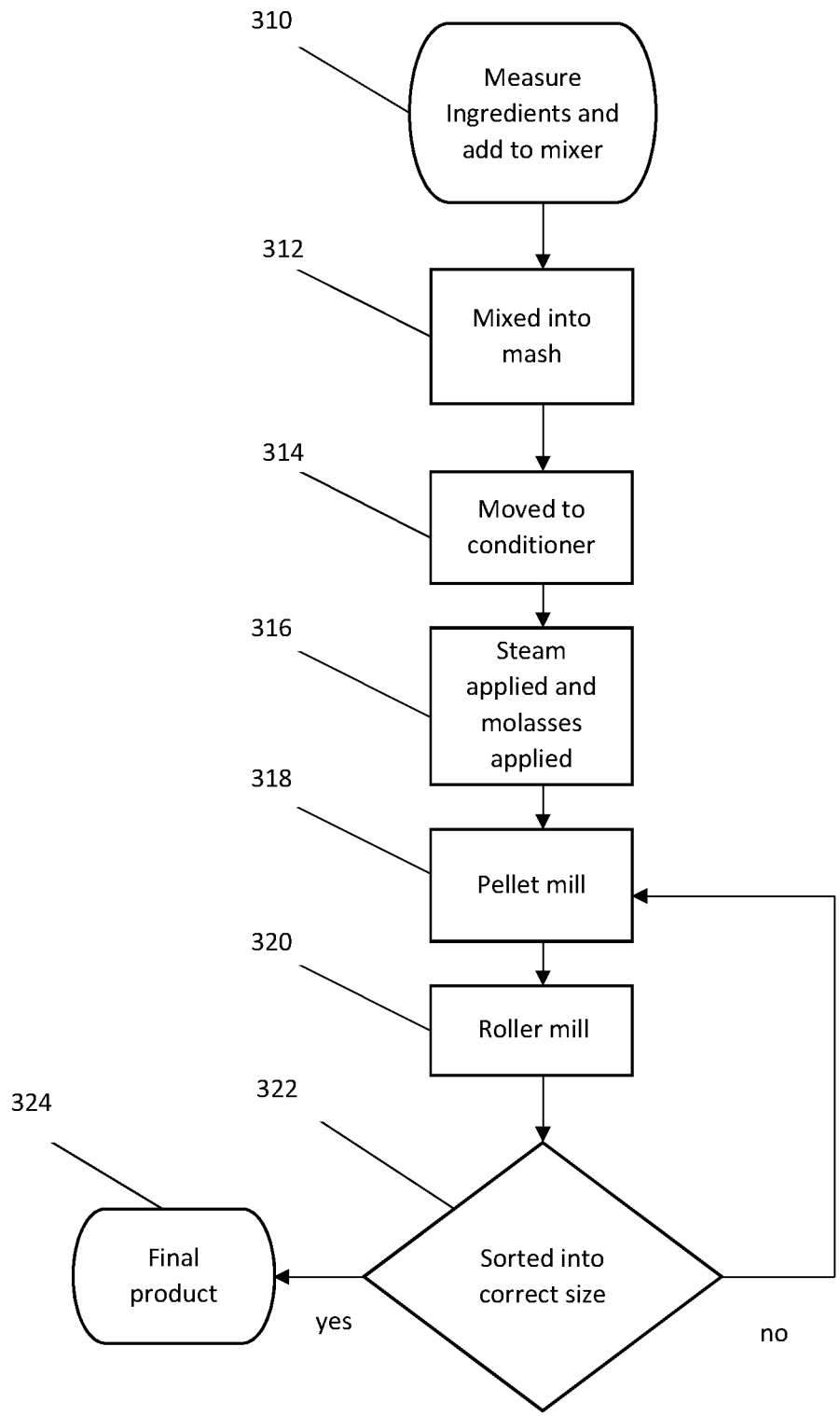
FIG. 3 is a block diagram of an example process for making the invention.

Referring to FIG. 3, all ingredients except molasses (or other sugar ingredient) may be accurately measured and mixed together 310 in an industrial mixer 210 with a binding agent. Any binding agent may be used (such as Ameribond) or no binding agent may be required at all depending on the desired consistency of the fertilizer. The ingredients may then be thoroughly mixed together to create a mash 312. The mash is then moved to a separate conditioning basin 314. While in the conditioning basin, steam at a temperature of about 130 degrees Fahrenheit to about 190 degrees Fahrenheit is applied to the mash 316. While the steam is applied, molasses is applied to the mash 316. Molasses may be applied by spraying or any other application process. Molasses may be kept at a temperate of about 70 degrees Fahrenheit to about 90 degrees Fahrenheit. Once all the molasses is applied and completely integrated with the mash, the entire substance may be turned into pellets at a pellet-milling machine 318. The pellet temperature is allowed to cool down to a desired temperature range relative to the ambient temperature. The cooled pellets are then sent to a roller mill 320 to acquire a desirable consistency and texture. The crumbled pellets are then screened to ensure the correct size and texture is present 322. All pellet sizes that remain too large or too small are sent back to the pellet-milling machine 318, and all properly broken-down pellets are ready for use 324. A fungus may be added to the blend of materials. The molasses enables the fungus to thrive and benefit the health of the plant eco-system. The molasses has a beneficial effect on all fungi and microbes in the root system, which facilitates microbial growth beneficial to the plant root system. One example of a particular fungus useful in the present invention blend is known as Mycorrhiza.

An exemplary embodiment of the invention is as follows:

| Plant source organic material | 0-50% (percent by weight) |
| Animal source organic material | 10-70% |
| Added minerals | 1-20% |
| Molasses | 0.5-15% |
| Other ingredients | 0-15% |

(other ingredients are, such as, but not limited to, binding agent, water, Mycorrhizal fungi)

Another exemplary embodiment of the present invention is as follows:

| Animal manure | 85-99% |
| Molasses | 1-15% |

Yet another exemplary embodiment of the present invention is as follows:

| peat | 85-99% |
| Molasses | 1-15% |

Yet another exemplary embodiment of the present invention is as follows:

| Animal slaughter remains | 85-99% |
| Molasses | 1-15% |

Yet another exemplary embodiment of the present invention is as follows:

| Plant matter compost | 85-99% |
| Molasses | 1-15% |

Yet another exemplary embodiment of the present invention is as follows:

| Plant meal | 20-60% |
| Bone meal | 0-45% |
| Fungi | 0-10% |
| Molasses | 1-10% |
| Minerals | 1-20% |
| Fillers and binders | 1-45% |

Even further exemplary embodiments of the present invention are set forth in the charts below:

| | Formula (percent by weight) | | |
| Ingredient | A | B | C |
| --- | --- | --- | --- |
| Plant based ingredients | 30-50 | 30-50 | 0-20 |
| Animal based ingredients | 25-45 | 50-70 | 10-30 |
| Minerals | 10-30 | 1-20 | 1-20 |
| Manure | 0 | 0 | 20-50 |
| Fungi | 0-2 | 0-1 | 0-2 |
| Molasses | 0.5-15 | 0.5-15 | 0.5-15 |
| Flavors or aromas | 0.1-2 | 0.1-2 | 0.1-2 |
| Water | 0-10 | 0-10 | 0-10 |
| Binders & other | 0-10 | 0-10 | 0-10 |

| Ingredient | Examples |
| --- | --- |
| Plant based ingredients | Soy bean meal, wheat midds, ground corn etc. |
| Animal based ingredients | Blood meal, feather meal, fish bone meal etc. |
| Minerals | Tri-calcium phosphate, sulfate of potash etc. |
| Manure | Poultry manure etc. |
| Microorganism | Fungi, bacteria, archaea etc. |
| Molasses | Cane or beet molasses |
| Flavors or aromas | *Vanilla*, peppermint, *citrus* etc. |
| Water | Water |
| Binders & other | Pellet binders etc. |

Any embodiment of the present invention may include any of the optional or exemplary features of the other embodiments of the present invention. The embodiments herein disclosed are not intended to be exhaustive or to unnecessarily limit the scope of the invention. The embodiments were chosen and described in order to explain the principles of the present invention so that others skilled in the art may practice the invention. Having shown and described embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A pelletized organic fertilizer produced by a method comprising the steps of:
   mixing organic ingredients including plant meal of 30 to 50 percent of the total mixture by weight, animal meal of 10 to 59.5 percent of the total mixture by weight, water of 1 to 10 percent of the total mixture by weight, and a fungi of 0 to 2 percent of the total mixture by weight in a mixer to create a mash;
   heating molasses to a temperature of about 70 to 100 degrees Fahrenheit to form a liquid;
   streaming the mash at a temperature of about 130 degrees Fahrenheit;
   spraying the liquid molasses on to the streaming mash so that 0.5 to 10 percent of the total weight of the resultant mixture is the molasses;
   pelletizing the mash and molasses mixture into pellets; and
   cooling the pellets;
   wherein said plant meal comprises soy bean meal, wheat midds, or ground corn.

2. The pelletized organic fertilized produced by the method of claim 1 wherein:
   said mash further comprises:
       manure of 20 to 50 percent of the total mixture by weight;
       minerals of 1 to 20 percent of the total mixture by weight; and
       binders of 1 to 10 percent of the total mixture by weight.

3. The pelletized organic fertilized produced by the method of claim 1 wherein:
   said mash further comprises flavors or aromas of 0.1 to 2 percent of the total mixture by weight.

4. The pelletized organic fertilized produced by the method of claim 1 wherein:
   said animal meal comprises blood meal, feather meal, or fish bone meal.

\* \* \* \* \*